United States Patent
Maor et al.

(10) Patent No.: US 11,436,343 B2
(45) Date of Patent: Sep. 6, 2022

(54) DEVICE, SYSTEM, AND METHOD OF POLICY ENFORCEMENT FOR RICH EXECUTION ENVIRONMENT

(71) Applicant: Arm Limited, Cambridge (GB)

(72) Inventors: Ehud Maor, Tel Aviv (IL); Avi Shif, Netanya (IL); David Yellin, Ganey-Tikva (IL); Ofir Drang, Kfar-Netter (IL)

(73) Assignee: ARM LIMITED, Cambridge (GB)

( * ) Notice: Subject to any disclaimer, the term of this patent is extended or adjusted under 35 U.S.C. 154(b) by 257 days.

(21) Appl. No.: 16/731,123

(22) Filed: Dec. 31, 2019

(65) Prior Publication Data

US 2021/0200882 A1 Jul. 1, 2021

(51) Int. Cl.
| G06F 21/60 | (2013.01) |
| G06F 16/2455 | (2019.01) |
| H04L 9/06 | (2006.01) |
| G06F 21/10 | (2013.01) |

(52) U.S. Cl.
CPC ........ G06F 21/602 (2013.01); G06F 16/2455 (2019.01); G06F 21/105 (2013.01); H04L 9/0637 (2013.01); *G06F 2221/0768* (2013.01); *H04L 2209/38* (2013.01)

(58) Field of Classification Search
CPC .. G06F 21/602; G06F 16/2455; G06F 21/105; G06F 2221/0768; G06F 16/71; G06F 21/57; G06F 21/74; H04L 9/0637; H04L 2209/38; H04L 9/088; H04L 2209/603; H04L 9/0897
See application file for complete search history.

(56) References Cited

U.S. PATENT DOCUMENTS

| 2006/0026417 A1* | 2/2006 | Furusawa | G06F 21/575 713/2 |
| 2009/0285398 A1* | 11/2009 | Liardet | H04L 9/32 380/277 |
| 2010/0281273 A1* | 11/2010 | Lee | F04B 33/00 713/193 |
| 2012/0226915 A1* | 9/2012 | Zollinger | G06F 21/10 713/193 |
| 2014/0075502 A1* | 3/2014 | Aissi | G06F 21/60 726/1 |
| 2015/0229471 A1* | 8/2015 | Nair | H04L 9/0891 713/171 |
| 2015/0270956 A1* | 9/2015 | Basmov | G06F 21/74 713/189 |

(Continued)

*Primary Examiner* — David Garcia Cervetti
(74) *Attorney, Agent, or Firm* — Talem IP Law, LLP

(57) ABSTRACT

Device, system, and method of policy enforcement for rich execution environment. An electronic device includes a Trusted Execution Environment (TEE), a Rich Execution Environment (REE), and a hardware-based secure subsystem which includes a cryptographic engine. The REE includes a cryptographic driver configured to initiate a request for TEE authorization to perform a particular cryptographic operation by the cryptographic engine on a data-item that is stored in a memory region that is accessible by the REE. The TEE includes a policies manager to determine whether the request from the REE is approved or rejected, and if approved, to inject data-items into the secure subsystem to enable performance of the requested cryptographic operation by the cryptographic engine.

18 Claims, 1 Drawing Sheet

(56) References Cited

U.S. PATENT DOCUMENTS

| | | |
|---|---|---|
| 2016/0070932 A1* | 3/2016 | Zimmer ................ H04L 9/0894 |
| | | 713/192 |
| 2016/0134621 A1* | 5/2016 | Palanigounder ...... H04W 12/35 |
| | | 713/156 |
| 2016/0139846 A1* | 5/2016 | Ekdahl ................ G06F 12/1491 |
| | | 711/163 |
| 2016/0380985 A1* | 12/2016 | Chhabra ............... H04L 63/061 |
| | | 713/171 |
| 2017/0109503 A1* | 4/2017 | Mangalore ......... H04N 21/2541 |
| 2017/0169213 A1* | 6/2017 | Zhao .................... H04L 9/3234 |
| 2017/0277869 A1* | 9/2017 | Liu ........................ G06F 21/10 |
| 2017/0288874 A1* | 10/2017 | Narendra Trivedi ... G06F 21/57 |
| 2018/0019880 A1* | 1/2018 | Wu ........................ G06F 21/50 |
| 2018/0129826 A1* | 5/2018 | Kim .......................... H04L 9/14 |
| 2018/0198603 A1* | 7/2018 | Cammarota .......... H04L 9/0625 |
| 2019/0052916 A1* | 2/2019 | Schwarz ............... H04L 9/3213 |
| 2019/0095351 A1* | 3/2019 | Chhabra ............... H04L 9/0897 |
| 2019/0114401 A1* | 4/2019 | De .......................... G06F 21/14 |
| 2019/0251298 A1* | 8/2019 | Zhu .................. G06Q 20/35765 |
| 2019/0268161 A1* | 8/2019 | Thaler, III ............ H04L 9/3247 |
| 2020/0007931 A1* | 1/2020 | Ho .......................... G06N 20/00 |
| 2020/0019695 A1* | 1/2020 | Sovio .................... G06F 21/602 |
| 2020/0034528 A1* | 1/2020 | Yang ....................... H04L 9/088 |
| 2020/0143041 A1* | 5/2020 | Jung ........................ G06F 21/53 |
| 2020/0175208 A1* | 6/2020 | Yu ........................... G06F 21/74 |
| 2020/0184089 A1* | 6/2020 | Ponsini ................... G06F 21/55 |
| 2020/0272737 A1* | 8/2020 | Ji ............................ G06F 21/74 |
| 2020/0274898 A1* | 8/2020 | Xie ..................... H04L 63/1425 |
| 2020/0366653 A1* | 11/2020 | Caceres .............. H04L 63/0853 |
| 2021/0034763 A1* | 2/2021 | Li ........................ H04L 9/3231 |

* cited by examiner

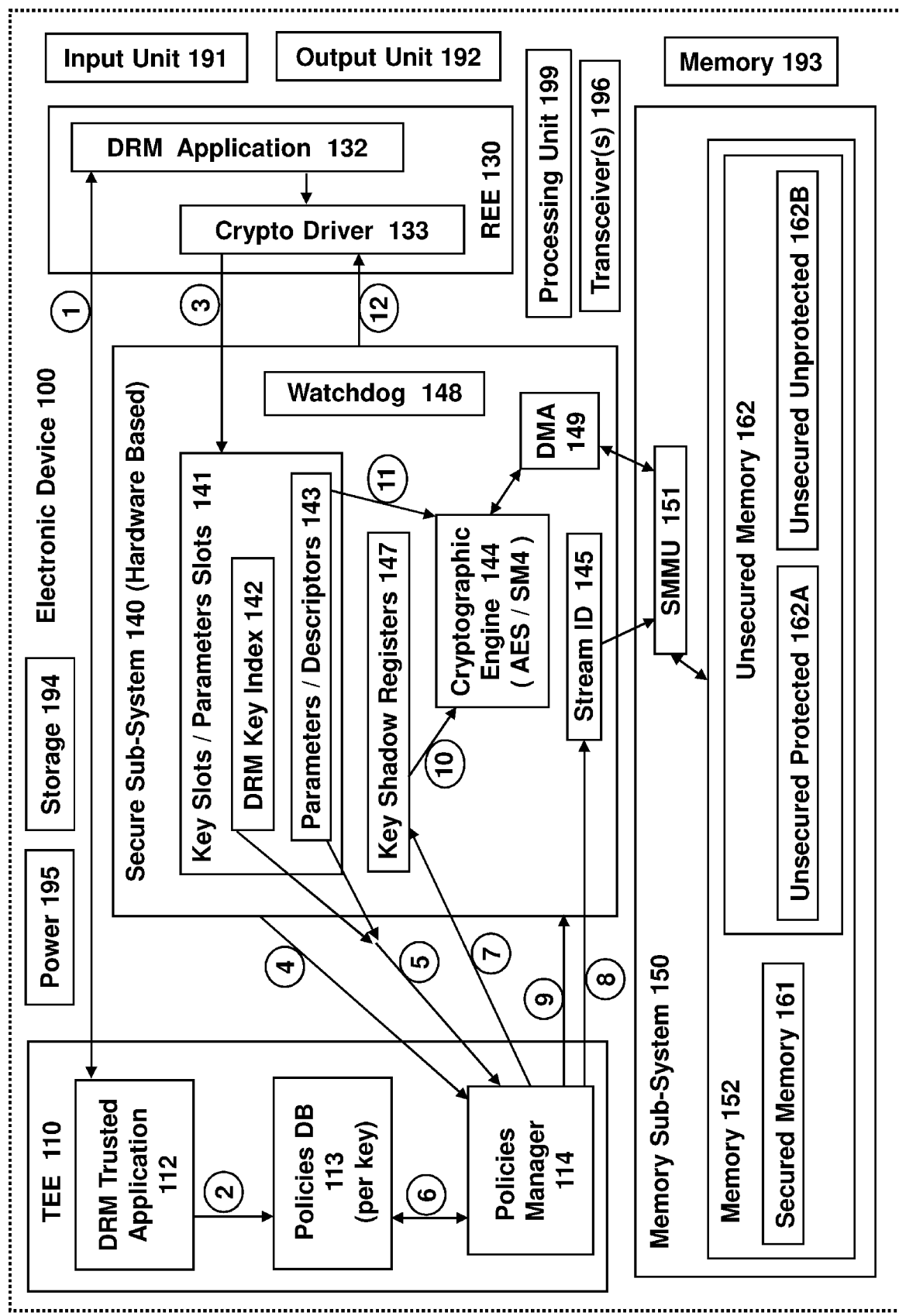

DEVICE, SYSTEM, AND METHOD OF POLICY ENFORCEMENT FOR RICH EXECUTION ENVIRONMENT

FIELD

Some implementations relate to the field of electronic devices.

BACKGROUND

Millions of users utilize electronic devices on a daily basis for various purposes. Smartphones, tablets, laptop computers, desktop computers, and other electronic devices are utilized for word processing, sending and receiving electronic mail (email), browsing the Internet, watching videos, capturing images, video conferencing, performing online purchases and transactions, and performing various other activities.

An electronic device typically includes a processor able to execute code, a memory unit able to store code and data, an input unit, an output unit, and other components.

BRIEF DESCRIPTION OF THE DRAWINGS

FIG. 1 a schematic illustration of a system, in accordance with some implementations.

DETAILED DESCRIPTION

In accordance with some implementations, an electronic device or system may comprise a Trusted Execution Environment (TEE), or a TEE Operating System (TEE OS), which enforces a TEE policy towards valuable data (e.g., purchased video content), which may be referred to as a datapath, that originates from or is initiated by (or that otherwise includes or involves) a co-located Rich Execution Environment (REE) and/or a REE Operating System (REE OS, or Rich OS). The TEE operates as a server or as a "slave" unit towards the REE. Accordingly, a Content Protection Policy (CPP) infrastructure or architecture may enable a REE-initiated datapath or a REE-controlled datapath, or a REE-managed datapath to operate and to be utilized in conjunction with a cryptographic operation (e.g., decryption or encryption), while adhering to (or complying with) one or more relevant TEE-stored and TEE-enforced policies. The CPP infrastructure may be implemented, for example, in an entirely hardware-based processor or processing unit, or in a processing unit or processing system that comprises hardware components and/or firmware components and/or software components, or by using other suitable implementation structures or architecture.

The CPP infrastructure may enable to invoke or to initiate one or more cryptographic operations (e.g., a Digital Rights Management (DRM) cryptographic operation, such as a DRM decryption operation of a DRM-protected frame of a DRM-protected video) directly from the REE. The TEE then selects and enforces the requested or the relevant secure CPP, which causes the system to accept (or authorize, or allow) or conversely to reject (or unauthorize, or block, or prevent, or deny) the cryptographic operations(s) requested or initiated by the REE, in a seamless manner that still enables the REE or the Rich OS to initiate and control the datapath.

The CPP infrastructure may obviate the need to utilize a real-time connection between the TEE and another component (e.g., a hypervisor or a Virtual Machine Monitor (VMM)) having a different Exception Level (EL); rather, the CPP infrastructure enables the REE to handle memory allocation and memory mapping, while the TEE only verifies the operations parameters, enforces a relevant policy (e.g., by checking that the current operation parameters are matching constraints or values or are within a range specified in the policy), and approves or rejects the requested cryptographic operation. Particularly, some implementations may reduce the need for buffering and/or for copying of data between the REE and the TEE; and/or may reduce the size of memory that is required to be pre-allocated as Unsecured Protected Memory or as Secure Memory that is accessible only by the TEE (or, in some implementations, by specific bus masters in a special "protected" mode of operation, which limits the visibility of non-secure software modules into internal register files) and not by the REE.

In accordance with the CPP infrastructure, a physical memory unit or a portion thereof, may be dynamically allocated and/or mapped and/or re-mapped, and may be utilized by an application stored in a regular (unsecured, unprotected) memory, and/or by an application stored in protected yet non-secured memory. For example, a DRM application may reside in unsecured storage, and may operate to playback or display a digital content-item (e.g., a DRM-protected video clip, an audio clip, an electronic book, or the like) if the suitable permission(s) are verified. Encrypted content is received and stored onto a regular (unsecured) memory region, and may be decrypted into protected (yet non-secured) memory.

In a conventional processing system, the DRM content decryption process, including the DRM policy enforcement, is performed by the TEE or by the TEE OS. In contrast, the CPP infrastructure enables the REE, or the Rich OS, to perform or to enable such DRM content decryption, if or after the TEE (or the TEE OS) provides the authorization to do so by enforcing the relevant CPP (e.g., the relevant DRM policy) selected from a database of policies stored within the TEE. In accordance with the CPP infrastructure, all or substantially all the memory handling (e.g., memory allocation, memory de-allocation or re-allocation, memory mapping or re-mapping) may be performed dynamically by the REE and not by the TEE, and need not be pre-allocated at boot time of the electronic device. The content decryption itself may also be initiated and/or performed by the REE (e.g., via a secure sub-system hardware component), and not by the TEE, as the CPP infrastructure provides a way for the TEE OS to enforce a DRM policy (or, to ensure that a DRM policy is complied with, as a condition for DRM playback or decryption or decoding), at the commencement of the decryption process or immediately prior to it (or as a condition to performing it, or as a prerequisite to performing it).

The DRM policy that is enforced by the TEE, or the relevant CPP that is enforced by the TEE, may utilize or may check one or more parameters or conditions; for example, hardware key(s) usage, DRM key renewal, or other policy rules or parameters or conditions. It is noted that while portions of the discussion herein may relate to DRM content or to DRM-related policy or operations, some implementations may similarly be utilized in conjunction with non-DRM related policies or content, or in conjunction with various types of cryptographic operations, decoding, encoding, decrypting, encrypting, authenticating, digitally signing, verifying signatures, or otherwise handling content or data or meta-data, or otherwise executing code or processing data by a REE application in a manner that is conditioned upon firstly obtaining authorization to do so from the TEE which ensures compliance with a TEE-stored and TEE-enforced policy.

The CPP infrastructure utilizes a CPP keys mechanism as a system-level solution, enabling to perform cryptographic operations (e.g., DRM decryption) from and/or within the REE or the REE OS or a REE application (e.g., with the assistance of a secure sub-system hardware component). A particular sub-system (e.g., implemented by utilizing an Arm® CryptoCell® or a similar component), which may be implemented using hardware components and/or software components, may provide the mechanism to notify the TEE or the TEE OS, via an interrupt or other mechanism, of a REE-based or a REE-initiated request to perform REE-side cryptographic operations (e.g., DRM decryption), together with providing the parameters or descriptors that are relevant to that request; thereby enabling the TEE or the TEE OS to select, apply and/or enforce the relevant CPP (e.g., the relevant DRM policy) in a secure manner, and to authorize or un-authorize the requested cryptographic operation (e.g., the requested DRM decryption).

Reference is made to FIG. 1, which is a schematic illustration of an electronic device 100, in accordance with some implementations. Device 100 may be, or may comprise, or may part of, for example, a computer, a desktop computer, a laptop computer, a tablet, a smartphone, a cellular phone, a portable communications device, a mobile communications device, a smart-watch, an electronic fitness device, a television or a smart television, an audio playback device, a video playback device, an electronic book (e-book) reader or reading device, a gaming device, a gaming console, a portable gaming device, a vehicular device, a vehicular dashboard component, a vehicular entertainment system, a home entertainment system, a portable entertainment system, a digital content consumption device, a digital content playback device, a home appliance, an electronic device within an autonomous vehicle or a self-driving vehicle, or the like.

Device 100 may comprise, for example: an input unit 191 able to receive input from an end-user (e.g., touchscreen, touchpad, keyboard, keypad, mouse, joystick, audio microphone); an output unit 192 able to display or otherwise provide output to the end-user (e.g., screen, monitor, display unit, touchscreen, audio speakers); a memory unit 193 able to store data and/or code, particularly for short-term storage (e.g., Random Access Memory (RAM), volatile memory); a storage unit 194 able to store data and/or code, particularly for long-term storage (e.g., Hard Disk Drive (HDD), Solid State Drive (SSD), Flash memory, non-volatile memory); a power source 195 able to provide electrical power to one or more components of device 100 (e.g., a battery, a power cell, a rechargeable battery, a replaceable battery, a connection to mains electricity); one or more wired and/or wireless communication transceivers 196 (e.g., a Wi-Fi or IEEE 802.11 transceiver, a Bluetooth transceiver, a cellular transceiver, a cellular 2G or 3G or 4G or 4G-LTE or 5G or other transceiver); and a processing unit 199 (e.g., a processor, a Central Processing Unit (CPU), a Graphics Processing Unit (GPU), a Digital Signal Processor (DSP), a processing core, a logic unit, or the like) able to execute code or machine-readable instructions, read data, process data, write data, and selectively command or trigger or cause other components of device 100 to perform operations.

Device 100 may comprise a Trusted Execution Environment (TEE) 110, or a secure execution environment or a secured execution environment, which may be an isolated and secured area of sub-system (e.g., in or of a processing unit or a logic unit), and which is able to perform processing operations in a manner that is protected from user-installed applications. The TEE 110 may comprise, or may be implemented by, a TEE Operating System (OS), which manages and provides the secure performance of operations within the TEE 110.

Device 100 may further comprise a Rich Execution Environment (REE) 130. The REE 130 may utilize or may be implemented by a conventional OS, which may be referred to as a "Rich OS" (e.g., Microsoft® Windows®, or Android®, or Apple® iOS®, which may manage user-installed applications, which may not necessarily require secured or highly-secured processing of data. Such Rich OS may comprise drivers, or may be associated with drivers, to enable one or more user-installed applications to access one or more hardware components of device 100 (e.g., to generate output to a screen; to receive input from a keyboard or a mouse or a touch-screen; to read from storage; or the like).

REE 130 may comprise an audio/video playback application, or a content playback application, such as a DRM application 132 able to playback DRM-protected content item(s) (e.g., audio clip, video clip). For example, if a suitable DRM license or DRM key is found and is validated by a Cryptographic Driver 133 (e.g., residing in the REE 130), then the content-item may be decrypted or decoded, and may be played or displayed or otherwise outputted via the DRM application 132.

The REE 130 may further comprise a Memory Sub-System 150, which includes a System Memory Management Unit (SMMU) 151 and a Memory Unit 152. The SMMU 151 may read data from memory unit 152, may write data to memory unit 152, may perform mapping and re-mapping of memory unit 152 or of portions thereof, may perform memory allocation or de-allocation or re-allocation operations, may perform caching operations, may manage caching, may manage or perform memory virtualization, may manage or enforce memory access privileges, and/or may perform other memory management operations with regard to memory unit 152.

Memory unit 152 may comprise two regions: a Secured Memory region 161, and an Unsecured Memory region 162. For example, the Secured Memory region 161 is a particular region in memory that is carved-out at boot time of device 100 and is pre-allocated or pre-designated at boot time to be utilized and managed and accessed exclusively by the TEE 110, and cannot be accessed by the REE 130 and/or by user-installed applications. In contrast, the Unsecured Memory region 162 is accessible by the REE 130, and is dynamically managed by the REE 130. The Unsecured Memory region 162 is further divided into two sub-regions: an Unsecured Protected Memory sub-region 162A (e.g., that only the TEE 110 can write into; and that the REE 130 can read from), and an Unsecured Unprotected Memory sub-region 162B (e.g., that the REE 130 can both write into and read from).

In a conventional system that needs to decrypt a DRM-protected video, each frame of the video is DRM-protected, and each DRM-protected frame of the video is firstly copied from a REE buffer to a TEE buffer, in order for the TEE to perform the DRM decryption operation. In contrast, in accordance with implementations of the CPP architecture, such copying or buffering may not be required (optionally, some implementations may support utilization of fragmented memory as input/output, such that REE buffers are very likely to be fragmented or may be in the form of a linked list); and a DRM-protected video frame need not be copied into a TEE-managed buffer or into a TEE-managed memory region; but rather, such DRM-protected video frame may remain only in a memory region that is managed exclusively by the REE and not by the TEE.

Device 100 further comprises a hardware-based Secure Sub-System 140, or a hardware-only secure sub-system, which enables the operations of the CPP infrastructure and which enables the particular flow of operations in which the TEE 110 and/or the REE 130 participate. For example, the Secure Sub-System 140 may comprise Key Slots/Parameters Slots 141, able to store a DRM key index 142 and other parameters/descriptors 143 (e.g., related to a REE-requested cryptographic operation) which are later utilized for DRM decryption (if and when such DRM decryption is authorized by TEE 110). The DRM decryption itself is performed by a cryptographic engine 144, such as an Advanced Encryption Standard (AES) chip or engine, an SM4 chip or engine, or the like, which is part of the hardware-based Secure Sub-System 140. The cryptographic engine 144 may comprise hardware registers, and/or may utilize a Direct Memory Access (DMA) unit 149 in order to read data from and/or write data into memory sub-system 150; particularly, SMMU 151 operates as a filtering unit that determines which component or module may access which portions of memory 152; and the DMA unit 149 is the intermediate unit between the cryptographic engine 144 and the SMMU 151.

In some implementations, the following demonstrative flow of operations may be performed; other and/or additional operations may be used.

Initially (arrow 1), a DRM handshake is performed between the REE 130 and the TEE 110. For example, the DRM application 132 in the REE 130 may initiate and send a handshake message towards a DRM trusted application 111 in the TEE 110. The handshake message may include, for example, DRM parameters and/or other data or meta-data to initialize the establishment of a particular DRM session between the DRM application 132 and the TEE 110. Arrow 1 is shown as a double-sided arrow: although the initiation of the handshake is from the REE 130 towards the TEE 110, the handshake process may further comprise response(s) and/or exchange(s) of information from the REE 130 towards the TEE 110 and from the TEE 110 towards the REE 130. It is noted that for demonstrative purposes, component 112 is labeled (and is referred to) as a DRM trusted application, although some implementations may utilize other suitable types of trusted applications within the TEE that need not necessarily be DRM-based, for example, High-bandwidth Digital Content Protection (HDCP), or the like.

The DRM trusted application 112 may then construct or configure or update (arrow 2) a policies database 113 in TEE 110, which may store one or more relevant policies or rules to be enforced or applied by TEE 110 per DRM key.

A cryptographic driver 133 of REE 130 then injects or writes or inserts (arrow 3), into the Key Slots/Parameters Slots 141 of the Secure Sub-System 140, a DRM key index 142 (e.g., having a single value out of 8 or 16 or other range of values) as well as parameters/descriptors 143 of a cryptographic operation that is requested to be performed by DRM application 132 (e.g., cryptographic decryption of a DRM-protected video frame). The descriptors/parameters 143 may comprise, for example: a descriptor or an indication of the type of cryptographic operation that is requested (e.g., decryption or encryption); a bit length of the cryptographic key to be used (e.g., 128 bits or 256 bits); an indication of the cryptographic algorithm that is requested to be applied; an indication of a requested mode of operation of a block cipher (e.g., a Cipher Block Chaining (CBC) mode, a Counter (CTR) mode, or the like); an Initialization Vector (IV); a value of a Counter (CTR); address-in or address-out or other address descriptors; indicators of DRM usage data or meta-data; and/or other parameters or descriptors. In some implementations, the insertion of data-items from the cryptographic driver 133 of the REE 130 into the Key Slots/Parameters Slots 141 of the secure sub-system 140, may optionally be performed via a buffering mechanism or a queuing mechanism; and may be a no-changes-allowed type or writing or insertion, such that data-items that were introduced by the cryptographic driver 133 of the REE 130 into the Key Slots/Parameters Slots 141 of the secure sub-system 140 cannot be modified or erased or removed or over-written by the cryptographic driver 133 and/or by other components of the REE 130.

The injection or the writing of such parameters/descriptors 143 and the DRM key index 142 into the Key Slots/Parameters Slots 141, or at least one of such writing or injection operations (e.g., utilization of the last key slot available), causes or triggers an interrupt (arrow 4) from the secure sub-system 140 towards the TEE 110, and particularly towards a Policies Manager 114 in the TEE 110 which receives such interrupt and is thus triggered to intervene and operate. Arrow 4 is pointing towards south-west, to indicate that the direction of the interrupt is from the secure sub-system 140 towards the policies manager 114 in the TEE 110.

The policies manager 114 in the TEE 110 reads or obtains or otherwise actively fetches (arrow 5), from the Key Slots/Parameters Slots 141 of the secure sub-system 140, a copy of the DRM key index 142 and/or a copy of parameters/descriptors 143 of cryptographic operation that is requested by the REE 130. The obtaining operations may be performed, for example, by utilizing a hardware interface (e.g., by reading from the registers of the cryptographic engine 144). Arrow 5 is shown pointing south-west to indicate the direction in which the information flows, from the secure sub-system 140 to the policies manager 114; although the policies manager 114 may actively access the secure sub-system 140 to actively fetch or read such information therefrom.

The policies manager 114 checks or verifies (arrow 6) whether the requested DRM operation is permissible or is valid, based on the DRM key index and the particular policy associated with that DRM key, and (optionally, in some implementations) based also on the other parameters or descriptors as obtained from the Key Slots/Parameters Slots 141.

If the DRM operation is verified as permissible or valid, then the policies manager 114 of the TEE 110 proceeds to load or transfer or write a suitable DRM key (arrow 7) into shadow key registers 147 in the Secured Sub-System 140. Additionally, the policies manager 114 of the TEE 110 writes or injects or transfers (arrow 8) a required Stream ID 145 into the Secured Sub-System 140, via a hardware interface, based on information that the policies manager 114 obtains from the policies database 113 within the TEE 110. The Stream ID 145 is copied or transferred to the SMMU 151 of the memory sub-system 150 (such as, optionally, via the DMA unit 149).

The policies manager 114 of the TEE 110 further sends or generates or notifies an operation verdict (arrow 9), such as either an authorization decision or a rejection decision, to the secure sub-system 140, by way of register signaling or other suitable notification method. For example, if the policies manager 114 determines that the requested DRM operation is permissible, based on the relevant policy obtained from the policies database 113 and in view of the DRM index key 142 and the parameters/descriptors 143, then the policies manager 114 of the TEE 110 sends an authorization message or an approval message to the secure sub-system 140. Conversely, if the policies manager 114 determines that the requested DRM operation is not permissible, then the policies manager sends a rejection message to the secure sub-system 140, and/or causes a reset to (or a denial of, or a failure of, or an aborting of) the requested DRM operation (e.g., by triggering a reset of the cryptographic engine 144, or a reset of its cryptographic parameters), and/or by setting or triggering an error interrupt towards the REE 130 (which waits to receive either a completion message or an error interrupt). Accordingly, the cryptographic engine 144 in the secure sub-system 140, is either (i) triggered to proceed and perform the DRM operation by an acceptance message from the policies manager 114 of the TEE 110, or (ii) is triggered to reset or abort or otherwise not perform the DRM operation by a rejection signal or an interrupt from the policies manager 114 of the TEE 110.

In the case of acceptance or authorization of the requested DRM operation, the Secure Sub-System 140 loads the DRM key that was provided by the policies manager 114, from the shadow key registers 147 into the relevant cryptographic engine 144 (arrow 10), which also obtains the parameters/descriptors of the cryptographic operation from the Key Slots/Parameters Slots 141 (arrow 11); and the requested DRM operation or cryptographic operation is performed by the relevant cryptographic engine 144 by using the relevant parameters (the DRM key, the IV, and other data or meta-data).

Upon completion of the cryptographic operation, an interrupt or a completion message is issued (arrow 12) by the Secure Sub-System 140 to the cryptographic driver 133 in the REE 130. In some implementations, a final interrupt may be issued back to the REE 130 in any case, or at the end of the cryptographic operation; or if a pre-defined time-period has elapsed without receiving an operation verdict (acceptance or rejection) from the policies manager 114 of the TEE 110. For example, a Watchdog Module 148 in the Secure Sub-System 140 may monitor the elapsed time since the request was made to the TEE 110, and may issue a rejection interrupt back to the cryptographic driver 133 of the REE 130 if no operation verdict message was received from the policies manager 114 of the TEE 110 within a pre-defined timeout period (e.g., within 1 second, or within 2 seconds, or within other pre-defined period); such as, to enforce a pre-defined policy that a requested cryptographic operation, that did not receive a positive authorization response from the policies manager 114 of the TEE 110 within a pre-defined time period, is handled as a rejected or a denied cryptographic operation.

Some implementations may comprise and/or may utilize the following features or some of them: (a) allocation and utilization of Key Slots/Parameters Slots 141, to enable injection of information by the REE 130 with regard to a requested cryptographic operation that the TEE is requested to approve or deny; (b) an interrupt mechanism, particularly a REE-to-TEE interrupt (e.g., directly, or through the secure sub-system 140), and/or a secure sub-system 140 to TEE 130 interrupt, which triggers the policy manager 114 of the TEE 110 to operate once the REE 130 initiates a cryptographic operation or a cryptographic process that is associated with a particular DRM key index or with a particular key slot; (c) a hardware interface (e.g., implementing secure-only access) that allows the policy manager 114 of the TEE 110 to obtain the parameters or descriptors (and the DRM key index) of the requested cryptographic operations, and to verify them against a TEE-based policies database; (d) a hardware interface (e.g., implementing secure-only access) that allows the policies manager 114 of the TEE 110 to configure, set and/or modify the parameters of the requested cryptographic operation (e.g., the key data, the Stream_ID parameter); (e) a hardware interface (e.g., implementing secure-only access) that allows the policy manager 114 of the TEE 110 to selectively either accept or reject the cryptographic operation or cryptographic process that was requested by the REE 130, and securely issue a decision verdict or an operation verdict to the secure sub-system; (f) an optional utilization of Watchdog Module 148 to reject or to block or to deny a requested cryptographic operation if the policy manager 114 of the TEE 110 did not authorize it within a pre-defined, monitored, time period; (g) an interface or protocol (e.g., similar to Arm® Advanced eXtensible Interface (API)) that enables utilization of protocol side channel signals (e.g., Stream_ID) that may be controlled by a master entity (e.g., an AXI Master or AXIM) based on the TEE configuration.

In accordance with the CPP architecture, the REE 130 (and not the TEE 110) is the entity that controls and manages the data-path and pushes the content item (e.g., discrete, separate, DRM-protected frames of a DRM-protected video, on a frame-by-frame basis) into the secure sub-system 140, and it is the REE 130 (and not the TEE 110) that initiates the cryptographic process and initiates the invocation of the TEE 110 for the purpose of authorizing or rejecting the requested cryptographic operation; without the need to copy or buffer or inject the actual payload (e.g., each DRM-protected frame) from the REE 130 into the TEE 110, or from the REE 130 into the Secured Memory region 161. In some implementations, optionally, each such DRM-protected frame may be copied from the Unsecured Unprotected memory 162B to the Unsecured Protected memory 162A, but need not be copied into (or buffered or stored at) the Secured Memory 161. The DRM-protected frame is thus maintained, at all times, only in Unsecured Memory 162, and only in memory regions that the REE 130 (and not the TEE 110) is capable of dynamically managing, and only in memory regions that do not require carving-out at boot time of the device, and only in memory regions that the REE is capable of dynamically allocating or re-allocating or re-mapping post-boot time and during regular (non-boot) operation of the electronic device.

The CPP architecture may be particularly beneficial when integrated into electronic devices or electronic systems that require extensive decryption of DRM content, for example, a smartphone, a tablet, a desktop computer, a laptop computer, a gaming console or gaming device, an audio/video playback device, a Digital Television (DTV) unit, a television, a smart television, an Internet-connected television, a set-top box, a cable box, a cable television box or decoder, a satellite television box or decoder, a multimedia streamer, a video streamer, an audio streamer, an audio/video streamer, a vehicular audio/video system, a vehicular audio/video playback unit, a vehicular multimedia system, or the like; as well as other suitable devices or systems which may require sharing of some (but not all) memory regions between a REE and a co-located TEE, particularly for cryptographic operations, decoding operations, decrypting operations, or DRM-related operations.

In accordance with some implementations, for example, an electronic device comprises: a Trusted Execution Environment (TEE) to securely execute code; a co-located Rich Execution Environment (REE) to execute code; and a co-located hardware-based secure sub-system which comprises a cryptographic engine able to perform cryptographic operations. The REE comprises a cryptographic driver configured to initiate a request for TEE authorization to perform a particular cryptographic operation by the cryptographic engine on a data-item that is stored in a memory region that is accessible by the REE. The TEE comprises a policies manager to determine whether said request from the REE is approved or rejected, and if approved, to inject one or more data-items into said secure sub-system to enable performance of said particular cryptographic operation by said cryptographic engine in the secure sub-system.

The policies manager in the TEE is to determine whether to approve or reject said request, and is to further determine how to configure said one or more data-items, based on a query to a per-key policies database within the TEE. The TEE further comprises a hardware interface for secure retrieval of policy data from said policies database by said policies manager. The policies manager in the TEE is to inject said one or more data-items into a shadow register in said secure sub-system; and the cryptographic engine in the secure sub-system utilizes data-items from said shadow register, to perform said particular cryptographic operation that was requested by said cryptographic driver of the REE.

The request to perform said particular cryptographic operation may comprise at least the following descriptors: (a) an indication of a Digital Rights Management (DRM) key index, (b) an indication of which cryptographic engine is requested to be invoked, (c) an indication of a requested mode of operation selected from the group consisting of encryption and decryption, (d) an indication of an Initialization Vector (IV) or a Counter, (e) an indication of a requested mode of operation of a block cipher which is selected from the group consisting of: a Cipher Block Chaining (CBC) mode, and a Counter (CTR) mode; wherein said descriptors were injected by the cryptographic driver of the REE into key slots in said secure sub-system.

The policies manager in the TEE is to utilize a hardware interface, between the TEE and the secure sub-system, to inject said one or more data-items into said secure sub-system. The policies manager of the TEE is to inject at least a value of a DRM Stream_ID parameter and an acceptance or rejection response to said request, over said hardware interface, into the secure sub-system. The secure sub-system further comprises a watchdog unit, to initiate a request rejection interrupt towards said cryptographic driver of the REE if a request approval is not received from the policies manager of the TEE within a pre-defined time period.

The request from the cryptographic driver of the REE towards the TEE is implemented as an interrupt from the secure sub-system to the policies manager of the TEE. The interrupt is triggered by insertion of one or more data-items by the cryptographic driver of the REE into one or more slots of the secure sub-system. The interrupt is initiated subsequent to an initial Digital Rights Management (DRM) handshake which initializes a particular DRM session between (i) a DRM application in the REE, and (ii) a DRM trusted application within the TEE.

The cryptographic operation may be a cryptographic operation selected from the group consisting of: (i) decryption of a media content item that is cryptographically associated with Digital Rights Management (DRM) protection, (ii) pre-transmission encryption of a media content item in accordance with High-bandwidth Digital Content Protection (HDCP).

The cryptographic operation may be decryption of a single DRM-protected frame of a DRM-protected video that a DRM application in the REE requests to playback. The cryptographic driver of the REE issues a separate request for decryption of each frame of said DRM-protected video, one frame at a time. The policies manager of the TEE determines, separately, for each request to decrypt each of said frames, whether to accept or reject said request, based on (i) a DRM key index and (ii) one or more descriptors of each requested decryption operation and (iii) a per-key policy obtained from a policies database within the TEE over a secure channel. The DRM-protected frame is stored by the REE in an unsecured unprotected memory region of a memory unit of the electronic device, that is accessible by the REE and by the TEE, and that is dynamically managed only by the REE.

The cryptographic operation may be encryption of a single frame of a video intended for DRM-protection. The cryptographic driver of the REE issues a separate request for encryption of each frame of said video, one frame at a time. The policies manager of the TEE determines, separately, for each request to encrypt each of said frames, whether to accept or reject said request, based on (i) a DRM key index and (ii) one or more descriptors of each requested encryption operation and (iii) a per-key policy obtained from a policies database within the TEE over a secure channel. The DRM-protected frame is stored by the REE in an unsecured unprotected memory region of a memory unit of the electronic device, that is accessible by the REE and by the TEE, and that is dynamically managed only by the REE.

In accordance with some implementations, a processing system comprises: a Trusted Execution Environment (TEE) to securely execute code, wherein the TEE is co-located near a Rich Execution Environment (REE). The TEE comprises a trusted Digital Rights Management (DRM) application, configured to establish a particular DRM session between the TEE and a DRM playback application of the REE. The TEE comprises a policies manager unit, (i) to receive from a secure sub-system of the processing system an interrupt indicating a request to authorize a particular DRM-related cryptographic operation by said secure sub-system on a content-item that is stored in unsecured unprotected memory that is dynamically managed by the REE, (ii) to verify said request based on data obtained by the policies manager unit from a co-located policies database within the TEE, (iii) to authorize said request by writing via a hardware interface one or more parameters into one or more shadow registers of the secure sub-system which are accessible by a cryptographic engine, said one or more parameters enabling said cryptographic engine of the secure sub-system to perform said particular DRM-related cryptographic operation.

The one or more parameters, that are written by the policies manager unit of the TEE via the hardware interface into the secure sub-system, may comprise at least a value of a DRM Stream_ID parameter. The policies manager unit of the TEE retrieves data from said co-located policies database of the TEE via a secure-only access over a hardware interface that connects the policies manager unit and the policies database.

The processing system may comprise a memory unit having: (i) a secured memory region that is carved-out at boot time and is pre-allocated for exclusive access of the TEE and not of the REE, and (ii) an unsecured memory region that is dynamically managed by the REE. The policies manager of the TEE authorizes or denies said particular DRM-related cryptographic operation with regard to a DRM-protected content-item that is stored only in the unsecured memory region, and that is not copied into and is not stored I the secured memory region.

In accordance with some implementations, a method is implementable by a processing system that comprises a Trusted Execution Environment (TEE) co-located with a Rich Execution Environment (REE). The method may comprise: performing a Digital Rights Management (DRM) handshake, to establish a particular DRM session between (i) a DRM playback application in the REE and (ii) a trusted DRM application in the TEE; storing, in a secure sub-system of said processing system that is accessible by both the REE and the TEE, one or more descriptors of a requested DRM operation that is requested by said DRM playback application of the REE; wherein said storing of the one or more descriptors triggers a sending of an interrupt to a policies manager unit in the TEE, wherein the interrupt indicates a request by the REE to obtain TEE authorization to perform said requested DRM operation; evaluating said request by said policies manager unit within the TEE, based on (i) one or more DRM policies that are securely stored in a co-located policies database within the TEE, and (ii) a DRM key index and other descriptors of said requested DRM operation, that are inserted by the REE into slots in the secure sub-system; if said request is evaluated as authorized, then: (I) inserting by the policies manager of the TEE, via a hardware interface, into one or more slots in the secure sub-system, one or more parameters that enable a cryptographic engine in the secure sub-system to perform said requested DRM operation; and (II) sending a request authorization message from the policies manager unit of the TEE to the cryptographic engine in the secure sub-system.

If said request is evaluated as authorized, then: performing said requested DRM operation in the cryptographic engine, by utilizing: (i) a value of a Stream_ID parameter that is provided securely over a hardware interface by the policies manager unit of the TEE, and (ii) a DRM key obtained from the cryptographic driver of the REE, and (iii) one or more parameters of the requested DRM operation as obtained from the cryptographic driver of the REE. The requested DRM operation may be a request to decrypt a DRM-protected frame of a DRM-protected video; and said evaluating of the request by the policies manager unit within the TEE, excludes and does not utilize copying or buffering said DRM-protected frame into a secured memory region that is accessible only by the TEE.

In some implementations, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some implementations are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some implementations may utilize a special-purpose machine or a specific-purpose device that is not a generic computer, or may use a non-generic computer or a non-general computer or machine. Such system or device may utilize or may comprise one or more components or units or modules that are not part of a "generic computer" and that are not part of a "general purpose computer", for example, cellular transceiver, cellular transmitter, cellular receiver, GPS unit, location-determining unit, accelerometer(s), gyroscope(s), device-orientation detectors or sensors, device-positioning detectors or sensors, or the like.

Some implementations may utilize an automated method or automated process, or a machine-implemented method or process, or as a semi-automated or partially-automated method or process, or as a set of steps or operations which may be executed or performed by a computer or machine or system or other device.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or terms such as "implementation" or "implementations", may indicate that the embodiment(s) or implementation(s) so described may optionally include a particular feature, structure, functionality, or characteristic, but not every embodiment or implementation necessarily includes the particular feature, structure, functionality or characteristic. Furthermore, repeated use of the phrase "in one embodiment" or "in one implementation", does not necessarily refer to the same embodiment, although it may. Similarly, repeated use of the phrase "in some embodiments" or "in some implementations", does not necessarily refer to the same set or group of embodiments or implementations, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some implementations may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a set-top box, a cables television box or receiver or decoder, a satellite-based television box or receiver or decoder, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some implementations may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some implementations may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more implementations, may be combined with, or may be utilized in combination with, one or more other functions, operations, components and/or features described herein with reference to one or more other implementations. Some implementations may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative implementations have been illustrated and described herein, various modifications, substitutions, changes, and equivalents may occur to those skilled in the art. Accordingly, the claims are intended to cover all such modifications, substitutions, changes, and equivalents.

What is claimed is:

1. An electronic device comprising:
   a Trusted Execution Environment (TEE) to securely execute code;
   a Rich Execution Environment (REE) to execute code;
   a hardware-based secure sub-system which comprises a cryptographic engine able to perform cryptographic operations;
   wherein the REE comprises a cryptographic driver configured to initiate a request for TEE authorization to perform a particular cryptographic operation by the cryptographic engine on a data-item that is stored in a memory region that is accessible by the REE;
   wherein the TEE comprises a policies manager to determine whether said request from the REE is approved or rejected, and if approved, to perform an injection of one or more data-items into said secure sub-system to enable performance of said particular cryptographic operation by said cryptographic engine in the secure sub-system, wherein in said injection, the policies manager in the TEE writes, via a hardware interface, said one or more data-items into a shadow register in said hardware-based secure sub-system that comprises said cryptographic engine; wherein the cryptographic engine in the secure sub-system utilizes the one or more data-items from said shadow register, to perform said particular cryptographic operation that was requested by said cryptographic driver of the REE.

2. The electronic device of claim 1,
   wherein the policies manager in the TEE is to determine whether to approve or reject said request, and is to further determine how to configure said one or more data-items, based on a query to a per-key policies database within the TEE.

3. The electronic device of claim 2,
   wherein the TEE further comprises a hardware interface for secure retrieval of policy data from said policies database by said policies manager.

4. The electronic device of claim 1,
   wherein said request to perform said particular cryptographic operation comprises at least the following descriptors:
   (a) an indication of a Digital Rights Management (DRM) key index,
   (b) an indication of which cryptographic engine is requested to be invoked,
   (c) an indication of a requested mode of operation selected from the group consisting of encryption and decryption,
   (d) an indication of an Initialization Vector (IV) or a Counter,
   (e) an indication of a requested mode of operation of a block cipher which is selected from the group consisting of: a Cipher Block Chaining (CBC) mode, and a Counter (CTR) mode;
   wherein said descriptors were injected by the cryptographic driver of the REE into key slots in said secure sub-system.

5. The electronic device of claim 1,
   wherein the policies manager of the TEE is to inject at least (i) a value of a DRM Stream_ID parameter and (ii) an acceptance or rejection response to said request, over said hardware interface, into the secure sub-system.

6. The electronic device of claim 1,
wherein the secure sub-system further comprises a watchdog unit, to initiate a request rejection interrupt towards said cryptographic driver of the REE if a request approval is not received from the policies manager of the TEE within a pre-defined time period.

7. The electronic device of claim 1,
wherein said request from the cryptographic driver of the REE towards the TEE is implemented as an interrupt from the secure sub-system to the policies manager of the TEE,
wherein said interrupt is triggered by insertion of one or more data-items by the cryptographic driver of the REE into one or more slots of the secure sub-system.

8. The electronic device of claim 7,
wherein said interrupt is initiated subsequent to an initial Digital Rights Management (DRM) handshake which initializes a particular DRM session between (i) a DRM application in the REE, and (ii) a DRM trusted application within the TEE.

9. The electronic device of claim 1,
wherein said cryptographic operation is a cryptographic operation selected from the group consisting of: (i) decryption of a media content item that is cryptographically associated with Digital Rights Management (DRM) protection, (ii) pre-transmission encryption of a media content item in accordance with High-bandwidth Digital Content Protection (HDCP).

10. The electronic device of claim 1,
wherein said cryptographic operation is decryption of a single DRM-protected frame of a DRM-protected video that a DRM application in the REE requests to playback;
wherein the cryptographic driver of the REE issues a separate request for decryption of each frame of said DRM-protected video, one frame at a time;
wherein the policies manager of the TEE determines, separately, for each request to decrypt each of said frames, whether to accept or reject said request, based on (i) a DRM key index and (ii) one or more descriptors of each requested decryption operation and (iii) a per-key policy obtained from a policies database within the TEE over a secure channel;
wherein said DRM-protected frame is stored by the REE in an unsecured unprotected memory region of a memory unit of the electronic device, that is accessible by the REE and by the TEE, and that is dynamically managed only by the REE.

11. The electronic device of claim 1,
wherein said cryptographic operation is encryption of a single frame of a video intended for DRM-protection;
wherein the cryptographic driver of the REE issues a separate request for encryption of each frame of said video, one frame at a time;
wherein the policies manager of the TEE determines, separately, for each request to encrypt each of said frames, whether to accept or reject said request, based on (i) a DRM key index and (ii) one or more descriptors of each requested encryption operation and (iii) a per-key policy obtained from a policies database within the TEE over a secure channel;
wherein said DRM-protected frame is stored by the REE in an unsecured unprotected memory region of a memory unit of the electronic device, that is accessible by the REE and by the TEE, and that is dynamically managed only by the REE.

12. A processing system comprising:
a Trusted Execution Environment (TEE) to securely execute code, wherein the TEE is co-located near a Rich Execution Environment (REE);
wherein the TEE comprises a trusted Digital Rights Management (DRM) application, configured to establish a particular DRM session between the TEE and a DRM playback application of the REE;
wherein the TEE comprises a policies manager unit, (i) to receive from a secure sub-system of the processing system an interrupt indicating a request to authorize a particular DRM-related cryptographic operation by said secure sub-system on a content-item that is stored in unsecured unprotected memory that is dynamically managed by the REE, (ii) to verify said request based on data obtained by the policies manager unit from a co-located policies database within the TEE, and (iii) to authorize said request by writing via a hardware interface one or more parameters into one or more shadow registers of the secure sub-system which are accessible by a cryptographic engine, said one or more parameters enabling said cryptographic engine of the secure sub-system to perform said particular DRM-related cryptographic operation.

13. The processing system of claim 12,
wherein said one or more parameters, that are written by the policies manager unit of the TEE via the hardware interface into the one or more shadow registers of the secure sub-system, comprise at least a value of a DRM Stream_ID parameter.

14. The processing system of claim 12,
wherein the policies manager unit of the TEE retrieves data from said co-located policies database of the TEE via a secure-only access over a hardware interface that connects the policies manager unit and the policies database.

15. The processing system of claim 12,
wherein the processing system comprises a memory unit having: (i) a secured memory region that is carved-out at boot time and is pre-allocated for exclusive access of the TEE and not of the REE, and (ii) an unsecured memory region that is dynamically managed by the REE;
wherein the policies manager of the TEE authorizes or denies said particular DRM-related cryptographic operation with regard to a DRM-protected content-item that is stored only in the unsecured memory region, and that is not copied into and is not stored in the secured memory region.

16. A method implementable by a processing system that comprises a Trusted Execution Environment (TEE) co-located with a Rich Execution Environment (REE), the method comprising:
performing a Digital Rights Management (DRM) handshake, to establish a particular DRM session between (i) a DRM playback application in the REE and (ii) a trusted DRM application in the TEE;
storing, in a secure sub-system of said processing system that is accessible by both the REE and the TEE, one or more descriptors of a requested DRM operation that is requested by said DRM playback application of the REE;
wherein said storing of the one or more descriptors triggers a sending of an interrupt to a policies manager unit in the TEE, wherein the interrupt indicates a request by the REE to obtain TEE authorization to perform said requested DRM operation;

evaluating said request by said policies manager unit within the TEE, based on (i) one or more DRM policies that are securely stored in a co-located policies database within the TEE, and (ii) a DRM key index and other descriptors of said requested DRM operation, that are inserted by the REE into slots in the secure sub-system;

if said request is evaluated as authorized, then: (I) inserting by the policies manager of the TEE, via a hardware interface, into one or more slots of shadow registers in the secure sub-system, one or more parameters that enable a cryptographic engine in the secure sub-system to perform said requested DRM operation; and (II) sending a request authorization message from the policies manager unit of the TEE to the cryptographic engine in the secure sub-system.

17. The method of claim 16, further comprising:

if said request is evaluated as authorized, then: performing said requested DRM operation in the cryptographic engine, by utilizing: (i) a value of a Stream_ID parameter that is written securely into said shadow registers over said hardware interface by the policies manager unit of the TEE, and (ii) a DRM key obtained from the cryptographic driver of the REE, and (iii) one or more parameters of the requested DRM operation as obtained from the cryptographic driver of the REE.

18. The method of claim 16, wherein the requested DRM operation is a request to decrypt a DRM-protected frame of a DRM-protected video;

wherein said evaluating of the request by the policies manager unit within the TEE, excludes and does not utilize copying or buffering said DRM-protected frame into a secured memory region that is accessible only by the TEE.

* * * * *